(No Model.) 4 Sheets—Sheet 2.

S. S. WHEELER.
ELECTRIC ELEVATOR.

No. 324,621. Patented Aug. 18, 1885.

No load   1000 Volts ⟵
          990 Volts ⟶

Fig. 6,

Load      1000 Volts ⟵
          890 Volts ⟶

Fig. 7,

Descending load  1000 Volts ⟵
                 1090 Volts ⟶

WITNESSES
Wm A. Skinkle
Geo W. Breck

INVENTOR
Schuyler S. Wheeler.
By his Attorneys
Baldwin, Hopkins & Peyton

N. PETERS. Photo-Lithographer, Washington, D. C.

(No Model.) 4 Sheets—Sheet 4.

S. S. WHEELER.
ELECTRIC ELEVATOR.

No. 324,621. Patented Aug. 18, 1885.

Witnesses
Geo. W. Breck
Jos. S. Latimer

Inventor
Schuyler S. Wheeler
By his Attorneys
Baldwin, Hopkins & Peyton

UNITED STATES PATENT OFFICE.

SCHUYLER S. WHEELER, OF NEWBURG, NEW YORK.

ELECTRIC ELEVATOR.

SPECIFICATION forming part of Letters Patent No. 324,621, dated August 18, 1885.

Application filed December 17, 1884. (No model.)

*To all whom it may concern:*

Be it known that I, SCHUYLER S. WHEELER, of the city of Newburg, county of Orange, and State of New York, have invented certain new and useful Improvements in Electric Elevators, of which the following is a specification.

The primary object of my invention is to provide an organization for raising and lowering matter in which the energy developed or expended by the descent of the material is utilized to supplement the electric energy in the working system or circuits, or to reduce the sum of the electric energy that would otherwise be received from the primary source or generator.

The principles of operation of the invention are as follows: When an electro-dynamic machine is rotated by a current of a given polarity, its rotation tends to generate a back or counter current. If there were no mechanical resistance to the rotation of the motor by reason of friction or work being done, it would attain a speed at which, acting as a generator of electricity, it would create a back current exactly equal to the received or driving current—that is, if there were no mechanical resistance to the revolution of the machine it would give a back or counter current equal to the received current. If, however, mechanical power be applied to the motor to accelerate its motion beyond the speed that is imparted to it by the received current of electricity, the back or counter current generated by the machine will be greater than the received current. The result is, that the electro-motive force generated by the machine will predominate and will give a resultant current in the circuit of a direction opposite to the (at other times) received current, and equal to the difference between the received and generated currents, less, of course, loss by friction. Therefore the greater the mechanical power applied to the machine the greater will be the increase of speed and a proportionately greater counter-current will be generated by the motor. On the other hand, when the motor is running with no external mechanical influence, if a mechanical resistance, such as work to be done, is applied to the motor, its speed of rotation will be decreased. The amount of counter current generated will, therefore, be diminished, and consequently more current will be received from the source of energy than the motor tends to generate. Such excess of received current will equal the work being done.

Figures 3, 4, 5, 6, 7:
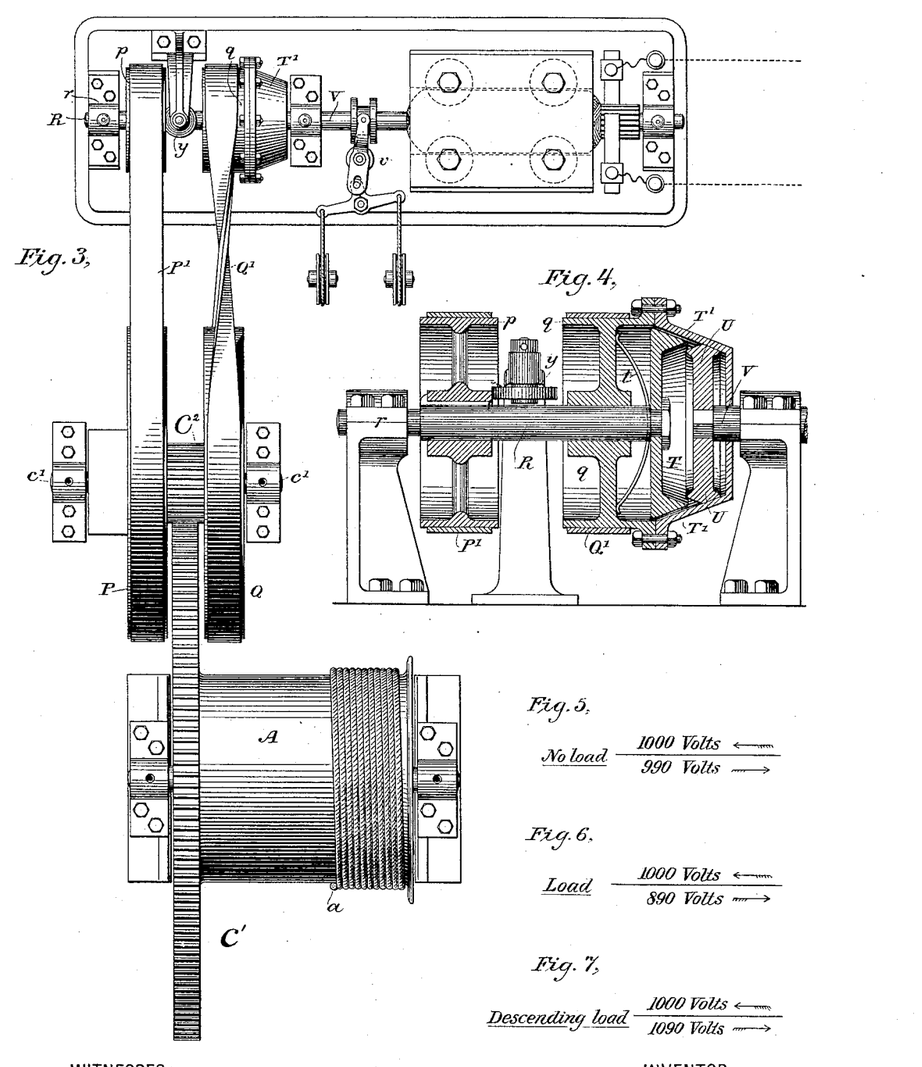
Fig. 3 is a detail view showing a hoisting-drum, driving-belts, clutch mechanism, and motor, illustrating another method of carrying out my invention.
Fig. 4 is a detail sectional view of said clutch mechanism.
Figs. 5, 6, and 7 are formulas indicating varying electrical conditions of a circuit with my invention in use.

Figure 5 represents the electrical condition of the circuit when the motor is running free and is being driven by a one-thousand-volt current.

For convenience of description I here describe the different currents by their electromotive forces, since they are all in the same circuit, and the electro-motive force is the primary difference. The motor having no load will attain a speed at which it generates, or tends to generate, a back or counter current equal in amount to that which it receives, less the loss by friction. Thus, with a received current of one thousand volts, after allowing ten volts as the equivalent of the energy necessary to overcome the friction of the apparatus, the motor will generate, or tend to generate, a back current of nine hundred and ninety volts. The current actually received will, therefore, be a ten-volt current.

Fig. 6 represents the electrical condition of the circuit when the dynamo is raising a load. Assuming that it will require an expenditure of one hundred volts electro-motive force to accomplish the required work and ten volts for friction, the effect of the load will be to retard the speed of the motor to a point where the counter-current generated will be eight hundred and ninety volts, or one hundred and ten volts less than the incoming current, and the difference—one hundred and ten volts— will represent the current actually used.

Fig. 7 represents the electrical condition of the circuit when the weight of the descending load increases the speed of the motor, thereby causing the counter electric current generated to exceed the current received. Assuming that the energy of the descending load represents one hundred volts, the speed of the motor will be increased until the reverse electro-motive force exceeds the direct electro-motive force one hundred volts, minus the allowance of ten volts for friction, the result being a reverse current of ninety volts excess over the received current.

In the accompanying drawings, Fig. 1 a diagram view illustrating electric elevating apparatus organized according to my invention. Fig. 2 is a plan view of the hoisting-drum, gearing, and motor. Fig. 8 is a detail view showing an arrangement in which the electrical conditions of the circuit are reversed and the motor-shaft thereby rotated in opposite directions, instead of using mechanical clutches to permit the shaft to always rotate in the same direction.

Figures 1, 2, 8:
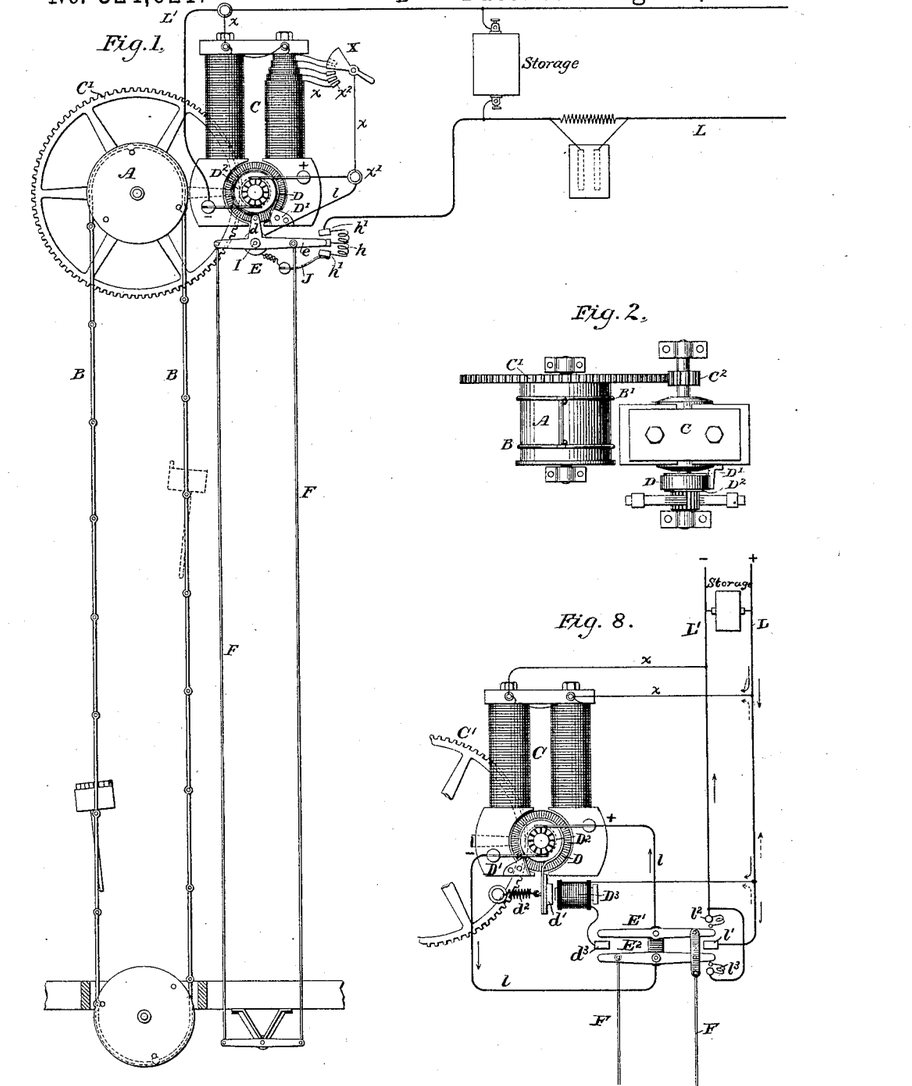

Referring solely, for the present, to Figs. 1 and 2, the drum A is illustrated as carrying an endless belt or load-support, B, on which hods are suspended. The electric motor C is geared to the drum by gears $C'$ $C^2$. The shipper or controlling rope F operates a pivoted arm or circuit-closer, E. A strap-brake, D, is secured at one end upon a suitable block or support, $D'$, mounted on the framing, and, passing around the brake-wheel or friction-disk $D^2$ on the motor-shaft, is secured to the arm or stud $d$ on the circuit-closer E. The operation of the circuit-closer by the shipper-rope, therefore, clutches or loosens the strap on the brake or friction-disk, according to the direction in which the circuit-closer is swung on its pivot. The circuit-closer is so arranged that its end or switch-arm $e$ traverses a series of insulated contacts, $h'$, and completes the circuit through a series of resistance-coils, $h$, before entirely breaking the circuit. This is desirable, as in a low-resistance dynamo run by a current of high electro-motive force it is best in starting the machine to increase the strength of the current gradually, to prevent too much current from passing through the machine until a suitable amount of motion is attained. An excess of current might burn the armature coils. The number of contacts and resistances shown may of course be increased. The pivot I of the circuit-closer E is connected with the final contact $h'$ by a spring-contact, J, so that the current will not be broken if the switch-arm $e$ should fail to make contact with any of the contacts of resistance-coils $h$. When, however, the switch-arm strikes the spring J, it throws it out of connection with the last contact $h'$, and the circuit is thus broken when the switch leaves the last contact $h'$. Normally the circuit from the source of electric energy is by the line L, contact $h'$, circuit-closer E, its pivot, and the line $l$, to the + brush of the machine, and by the − brush to the line $L'$. The amount of slack of the metallic brake-strap should be so proportioned that the strap will grip the brake-disk promptly when the switch-arm $e$ leaves the last contact $h'$ and interrupts the circuit. The field-magnet coils, as usual, are connected in branch or multiple-arc circuit, (represented by the line $x$, which runs from the positive brush through the coils to the line $L'$.) When the field-magnet coils are so connected, it will be obvious that the current in their coils will not be reversed when the counter-current generated in the motor-armature exceeds the received current, as above described, because the circuit $x$ always takes its current at the point $x'$ in the same direction, whether the effective electro-motive force in the circuit is from the line L to the armature of the motor or from the armature of the motor to the line L. The coils of the field-magnet, instead of being wound with one wire, are shown as wound with four independent wires, which are branches of the circuit $x$. Each of these branch circuits is connected with a contact, $x^2$, which is swept by a switch-plate, X, connected directly with the line $x$ between the coils and the + brush. The switch X is arranged so as to include one or more of the branches in the circuit $x$. In this way the normal speed or power of the apparatus may be changed by varying the resistance of the field-magnet circuit and the strength of the magnets, as is well understood, and as is illustrated in my patent of February 27, 1883.

With the organization thus far described, if matter is being elevated by means of the endless chain B, the received current will exceed that generated by the machine in its rotation, as above described. When thus working, the machine may be stopped, if necessary, at any point, by manipulating the shipper-rope to break the circuit and apply the brake. When material is being lowered by means of the endless chain, the speed of the motor will be increased beyond the speed which would be imparted to it by the received current, and in this event a back or counter current will be sent into the line L. Now, under the arrangement shown in Fig. 1, in which the elevators are to be connected in multiple arc, this generated current, when it exceeds the received current, may be utilized in two ways to reduce the consumption of current from the primary source of energy with which the lines L L' are connected—first, by means of a storage or secondary-battery system, in which said generated electric energy may be accumulated as chemical potential to be used when the machine is working to elevate material, and, second, by passing it back through a meter which registers the amount of current received from the primary source of energy. The effect of thus forcing back a current of electricity upon a system of distribution in which consuming stations are connected up in multiple arc and provided with meters—as, for instance, a multiple-arc system for incandescent lamps and for power—will not be a disturbing one, for the reason that the dynamos or generators of electricity at the central station of such a system are automatically governed to regulate the supply of electricity to the demand, and to maintain a uniform quantity in the working circuits. Therefore, if the effect of forcing the current derived from the lowering of material back to the dynamo or generator at the central station is to increase the sum of the current in the distributing-lines, the generator at the central station would compensate for this increase by producing less electricity, and when the effect is to reduce the electromotive force in the circuit by taking or drawing current therefrom the generator at the central station will automatically compensate for such a condition, and there will be no disturbance on the lines.

While the two methods which I have described of utilizing the current generated by the descent of the mass differ in some respects, they are, broadly considered, substantially the same. The generation of available energy or the creation of chemical potential in a secondary system represents the performance of a certain amount of work and the expenditure of a certain amount of energy, which being subsequently utilized reduces the sum of the power that would be otherwise required from the distributing system to run the elevator, and forcing the current back into the distributing system and causing the meter to register in a reverse direction is also an expenditure of energy, which acts to reduce the sum of the power actually received from the source of energy to perform the work to be done. Assuming, therefore, the performance of an equal amount of work under the two systems, and making allowance for differences in apparatus, the amount of electricity indicated by the meter as having been used in the two plans should be the same.

I have illustrated diagrammatically the well-known Edison meter, and specific description or illustration of it is unnecessary. So the secondary-battery or storage system which is connected in multiple arc with the lines L L' may be of any well-known organization. The excess of current generated by the motor will pass by short circuit to the storage system and there accumulate electric energy, which, when the conditions of the working of the motor are changed—that is, when work is being done by the motor—the electric energy from the storage system may be utilized to assist in performing the work. There will, therefore, be a less amount of received electricity indicated by the meter than would otherwise be the case.

I prefer to operate with a storage system, as illustrated in the drawings, though, as above stated, the storage system may be omitted and the effective counter-current sent back through the meter into the line.

I have now described one form of my invention. When necessary, however, as in most kinds of work, an ascending or descending elevator car or cage should be employed. With such an elevator, in order that the motor may run constantly in one direction, whether the car is ascending or descending, I employ a suitable clutch mechanism—such, for instance, as that illustrated in Figs. 3 and 4—which I will now describe.

In Fig. 3, A represents the hoisting-drum, on which the cable $a$, for raising and lowering the car or elevator-cage, is wound, as usual. The large gear C' on the drum gears with the smaller wheel $C^2$ on a shaft, $c'$, mounted in suitable bearings, and carrying two band-pulleys, P Q, from which driving-bands P' Q' extend to smaller band-pulleys, $p\ q$, mounted on a shaft, R. The band P' is straight, while Q' is twisted, so that the shaft $c'$, and consequently the hoisting-drum, may be driven in either direction by an unchanging direction of rotation of the motor-shaft, according as the drum is driven by the belt P' or the twisted belt Q', as is well understood. The pulley $p$ is fast on the shaft R, which is capable of endwise movement in its bearing $r$, and the pulley $q$ revolves loosely on said shaft. The pulley $q$ has securely bolted to it a clutch-cup, T', which envelops the end of the motor-shaft V, as shown, while the shaft R carries on its end, within the cup T', a correspondingly cone-shaped clutch-cup, T. A plate-spring, $t$, the ends of which bear upon the web of the pulley $q$, tends to throw the cups T T' into engagement. When the cups are so engaged, it is obvious that the elevator will be arrested, as the pulleys $p\ q$ will be clutched together, and their rotation would tend, through the bands P' Q', to rotate the hoisting-drum in opposite directions. On the endwise-moving motor-shaft V, or an endwise-moving sleeve on said shaft, a double-coned clutch-disk, U, is secured within the cup T' and between it and the cup T. The shipper-rope F is connected, in the usual way, with ordinary pivoted clutch-operating devices, $v$, by which the double coned disk U may be thrown either into engagement with the cup T' only, so that the windlass A will be driven by the twisted belt Q' in one direction; or the disk may be thrown into engagement with the cup T only, so that the windlass may be rotated in the opposite direction and drive the motor-shaft by the straight belt P' without reversing its direction of rotation.

A fixed pulley, $y$, located between the pulleys $p\ q$, so as to limit their lateral motion, assists the operation as follows: When the double-coned disk U is not in engagement with either the cup T' or the cup T, the motor-shaft will rotate without actuating the windlass, which will be held at rest by the reversely-acting belts P' Q'. If the clutch-disk is thrown to the right, as viewed in the drawings, Fig. 4, so as to engage the cup T', the pulley $y$ limits the movement of the pulley $p$, so that by the engagement of the disk U and the cup T' the latter is drawn out of contact with the cup T, which cannot follow it on account of the pulley $y$. If the clutch-disk be thrown in the opposite direction, the pulley $y$ limits the lateral motion of the pulley $q$, so that when the disk engages with the cup T it pushes it out of contact with the cup T'. With this or any equivalent suitable arrangement of clutch devices, which may readily be devised by those skilled in the art, the motor, though driven constantly in the same direction, may either cause or permit the rotation of the hoisting-drum in either direction. A practical organization of this kind, connected with the arrangement shown in Fig. 1, may be employed in either of the two ways above referred to—that is, in connection with a storage system, or by causing the excess of counter-current to be driven back into the circuit.

Instead of employing a mechanical clutch device, so that the motor-shaft may always revolve in one direction, whether the elevator is ascending or descending, I may employ electric reversing devices for reversing the circuit-connections, so as to permit the armature-shaft to be rotated in opposite directions. Such an arrangement is shown in Fig. 8, which represents a multiple-arc connection of the motor.

The coils of the field-magnet C are charged by a multiple-arc loop, $x$, and the main conductors L L' are connected with switch contacts as follows: The line L is connected with the central contact, $l'$, of three contacts, the other conductor, L', being connected with the contacts $l^2$ $l^3$, arranged on opposite sides of the central contact, $l'$. The brake-strap D is arranged to act on the friction-disk $D^2$, as in Fig. 1, except that under the present organization its movable end, instead of being connected with a lug on the shipper-bar E, carries an armature, $d'$. A coil-spring, $d^2$, connected with the armature end of the strap, tends constantly to cause it to grip the friction-disk. A brake-controlling magnet, $D^3$, is arranged in proper relation to the armature $d'$, and the coil of this magnet is connected in a multiple-arc loop running from the conductor L through the coil of the magnet to an insulated contact, $d^3$. Between the contact $d^3$ on the left and the three contacts $l'$ $l^2$ $l^3$, arranged in a vertical row on the right, two insulated switch-arms, E' E², are pivoted, so that their ends sweep the contact $d^3$ on one side and the contacts $l'$ $l^2$ $l^3$ on the other side. The switch-arms E' E² are connected by an insulated link, so that they move together, and are operated by a shipper-rope, F, as in Fig. 1. The armature-coils are included in a loop, $l$, which extends from the switch-arm E' to the positive brush of the machine, and from the negative brush to the opposite switch arm, E². The storage or secondary-battery system is connected between the conductors L L', as illustrated. Let us assume, now, that the motor is lifting the car through the gearing C' C², and that the switch-arms E' E² are drawn down at their right-hand ends, so that one end of the switch-arm E² will be on the insulated contact $d^3$ and the other end on the contact $l^2$, and the right-hand end of the switch E' on the contact $l'$. The armature-coil will therefore take its current from the conductor L through the contact $l'$, switch-arm E', conductor $l$, positive brush, armature-coil, negative brush, and wire $l$, to the switch-arm E² and contact $l^2$, to the opposite conductor, L'. The circuit of the brake-magnet $D^3$ will also be completed from the conductor L through the coil of the magnet, contact $d^3$, switch-arm E², and contact $l^2$, to the opposite conductor, L'. The magnet will therefore be energized, and, overcoming the pull of the brake-spring $d^2$, will loosen the strap on the friction-disk $D^2$ and permit the operation of the motor. The contact $d^3$ is so proportioned and placed that the movements of the switch operate the brake at the right instants with reference to the energizing of the armature of the motor. The current under this condition is represented by the solid arrows. If, now, the elevator-cage is permitted to descend, thus driving the motor-shaft in the opposite direction, the current generated will be in the same direction in the conductor L' as the current from the source of energy which actuates the motor, and the storage system would not, therefore, be properly charged to assist the current from the source of energy in subsequently elevating the car; but by reversing the switch-arms E' E², so as to make contact between the arm E' and the contacts $l^2$ $d^3$ and the arm E² and the contact $l'$, the current generated by the reverse motion of the motor will be thrown upon the conductor L in a direction opposite to the current received from the source of electric energy, and whenever this generated current is sufficient to overcome the current from the source of energy the storage system will be charged, as described in connection with Fig. 1. The current generated by the reversal of the motor is indicated by the dotted arrows. The current generated permits the descent of the car; but the mechanical resistance which the armature offers when being thus driven as a generator-armature prevents a too abrupt fall. The loop $x$, which includes the field-magnet coils, will, however, as is well understood, continue to take its current from the conductor L always in the same direction, as indicated by the full and dotted arrows, whether that current be received from the source of energy or be derived from the reversal of the motor, as just described. The same conditions are true as to the brake-magnet.

Figure 9:
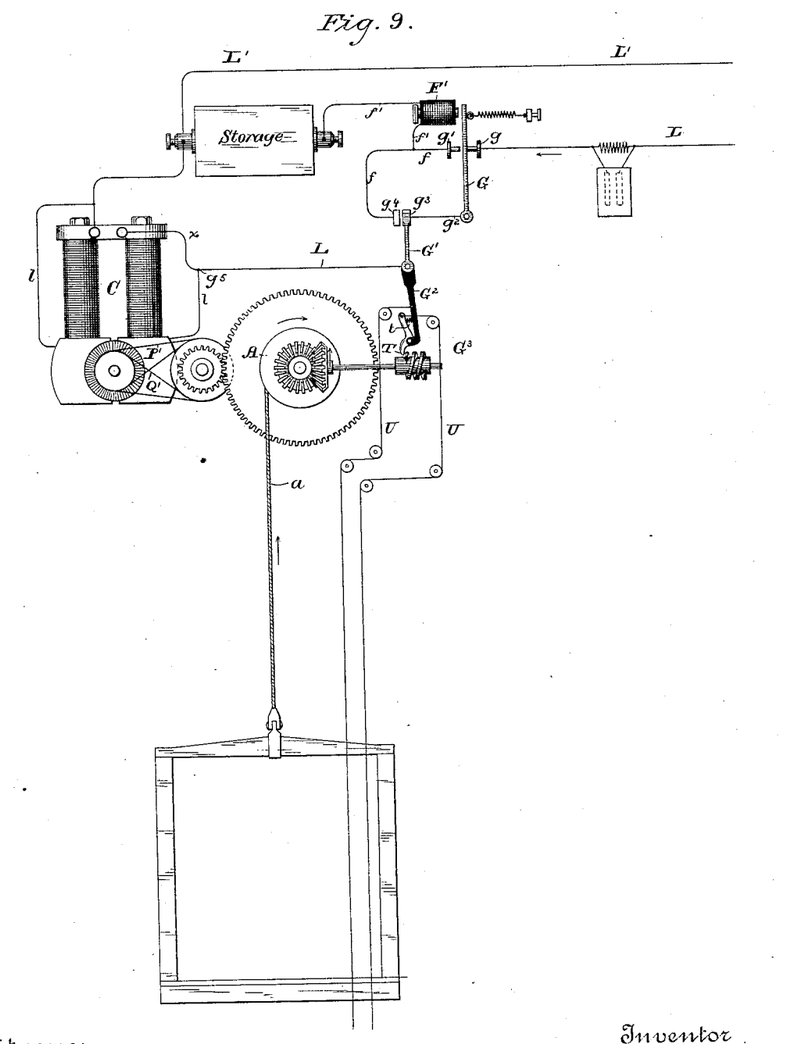
Fig. 9, a diagram view showing switch devices for throwing the secondary system into and out of operation.

Another arrangement of my invention is indicated in Fig. 9. In this case the motor-shaft is shown as connected with the gearing with reverse belts, and the apparatus is to be equipped with clutch devices, such as shown in Fig. 3, so as to permit the rotation of the motor-shaft in the same direction, whether the elevator-car is ascending or descending. The main line L is connected with a stop, $g$, opposite which a similar stop, $g'$, is arranged, and between the two stops a pivoted armature, G, rocks, so that in its movement it first makes contact with $g$ and then with $g'$. The pivot of the armature G is connected by a wire, $g^2$, with a contact, $g^3$, and alongside of this contact, but insulated therefrom, is a similar contact, $g^4$. These contacts are swept by a pivoted switch-arm, G', which is made of such a width as to make contact with one of the contacts before it leaves the other. From the pivot of the arm G' the line L continues to the point $g^5$, where the armature and field-magnet branches diverge. The contact $g^4$ is connected by a wire, $f$, with the contact $g'$, and is also connected by wire $f'$, through the coil of a magnet, F', which acts on the rocking armature G, with one pole of the storage or secondary-battery system. The opposite pole of the secondary battery is connected with the conductor L'. An ordinary coil-spring connected with the armature G tends to draw it away from its magnet into contact with the stop $g$. An insulated extension, $G^2$, of the arm G' gears by means of a latch, T, described below, with a worm, $G^3$, on a shaft driven by suitable gearing from the axle of the hoisting drum. This worm should, in practice, be on the main shaft, but is here set at right angles to it for clearness of illustration. The arm G' is by this arrangement made to complete contact with either $g^3$ or $g^4$, according to the direction of rotation of the worm and drum. As indicated by the arrows, the car is being elevated. The arm G' is on the contact $g^3$, and the rocking armature G is drawn against the contact-pin $g$. The main-line circuit is therefore completed from the line L through the contact $g$, armature G, wire $g^2$, contact $g^3$, arm G', and line L, through the armature and field-magnet coils, and the motor is actuated to elevate the car. Upon the descent of the car the drum and worm $G^3$ will be rotated in the opposite direction, although the direction of the motor-shaft, as before described, will not be changed. The worm will therefore throw the arm G' over to the contact $g^4$, thus breaking the main-line circuit before traced, and completing a circuit from the motor through the arm G', contact $g^4$, wire $f f'$, through the coil of the magnet F', to the storage system. The counter or reverse current, therefore, generated by this actuation of the motor will act upon the storage system, and create therein a chemical potential, which may be subsequently utilized to elevate the car. When the car has completed its descent, the circuit from the storage system will be completed through the wire $f'$, coil of magnet F', wire $f$, contact $g^4$, arm G', and line L L', to the opposite pole.

The magnet F' and armature G are arranged to act as follows: The spring of the armature G is so adjusted that the armature will only be drawn up toward the magnet against the contact $g'$ when a given current is traversing the circuit above traced of the secondary battery, and the adjustment is such that a current capable of so attracting the armature G' is capable of elevating the car. Therefore, when the shipper-rope is operated and the clutch devices shift so as to cause the elevation of the car, the worm $G^3$ shifts the arm G' to the contact $g^3$. If, now, there is sufficient current from the storage system, the armature G will be attracted against the contact $g'$, and the current which lifts the elevator will come from the storage system through wire $f'$, coil of magnet F', stop $g'$, arm G, contact $g^3$, and arm G'. Whenever the electro-motive force of the storage-circuit becomes so small that the magnet F' releases the armature G, the armature goes to its contact $g$, and the current thereafter is taken from the main line L. Under this organization, therefore, the storage system acts alone to elevate the car as long as it has sufficient power, and when that power fails then the current from the main source of energy acts alone to elevate the car.

The above description assumes that there is enough electric energy in the storage system to lift the car a short distance at the commencement of its ascent. This would perhaps not be the case when the apparatus had not been used for some time, or upon the first use of the storage-battery, if it had not been previously sufficiently charged. It is therefore desirable to have some means by which the boy in the car can positively control the arm G'. One convenient way is by means of the trigger T, which is pivoted on the end of the extension-arm $G^2$, and is held in normal relation to it by means of a spring, $t$. This spring is sufficiently strong to cause the arm G' $G^2$ to move with the worm, as described, when it acts on the end or lip of the trigger. A shipper-rope, U, runs over suitable pulleys through the car, as shown, and one end is connected with the arm $G^2$, and the other with the upper end of the trigger. By operating the shipper-rope the upper arm of the trigger may be drawn toward the arm $G^2$, thus throwing the lip of the trigger out of engagement with the worm, so that the switch-arm may be moved to the contact $g^3$ when necessary in starting the car upward. A few descents of the car will charge the storage system sufficiently for the apparatus to work automatically, as first described.

Figure 10:
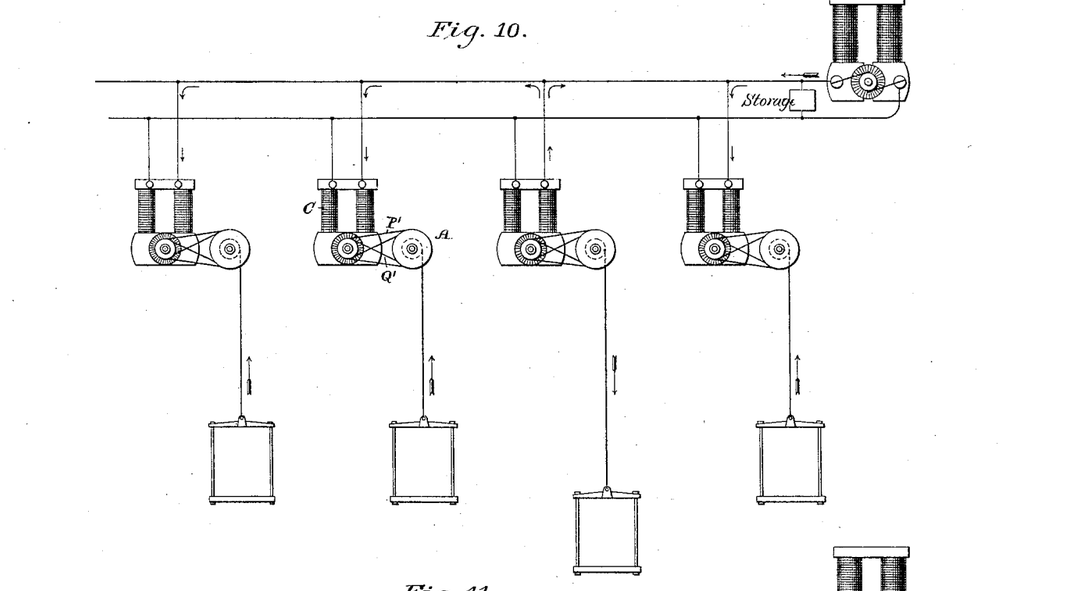
Fig. 10 is a diagram view illustrating several elevators connected in a generator-circuit in multiple arc.

In Fig. 10 I have illustrated diagrammatically a dynamic generator or source of electric energy with a number of elevator-motors connected in the circuit in multiple arc. Each motor is shown as connected with an ascending and descending elevator-car, and reverse belts P' Q' are employed, so that the motor-shaft may always run in the same direction. Under this arrangement the current generated in the motor by the descent of an elevator-cage will be a back or counter current. Three of the elevator-cars shown are represented as being raised, and the current received from the main source of energy is of course in the direction of the arrows. One of the cars, however, as shown by the arrow, is descending and the motor is generating a counter-current, which is being sent back into the line, as indicated by the arrows. Where the branch in which the motor is included is connected with the main line the generated current will divide in proportion to the resistance or electric condition of the circuit, as indicated by the arrows. This figure illustrates an arrangement of motors and elevators in accordance with my invention already described, and, as shown in Figs. 1 and 9, each motor may be connected with an independent storage system. In Fig. 10, however, I have shown a single storage system connected in multiple arc at the generator. Thus a current generated at any one of the motors which is of sufficient electro-motive force to overcome the received current and travel back to the generator will act upon this common storage system, the energy of which is subsequently utilized to raise any of the elevator-cars. Meters may be connected in the loops of the motors, as shown in Fig. 1, if desired.

Figure 11:
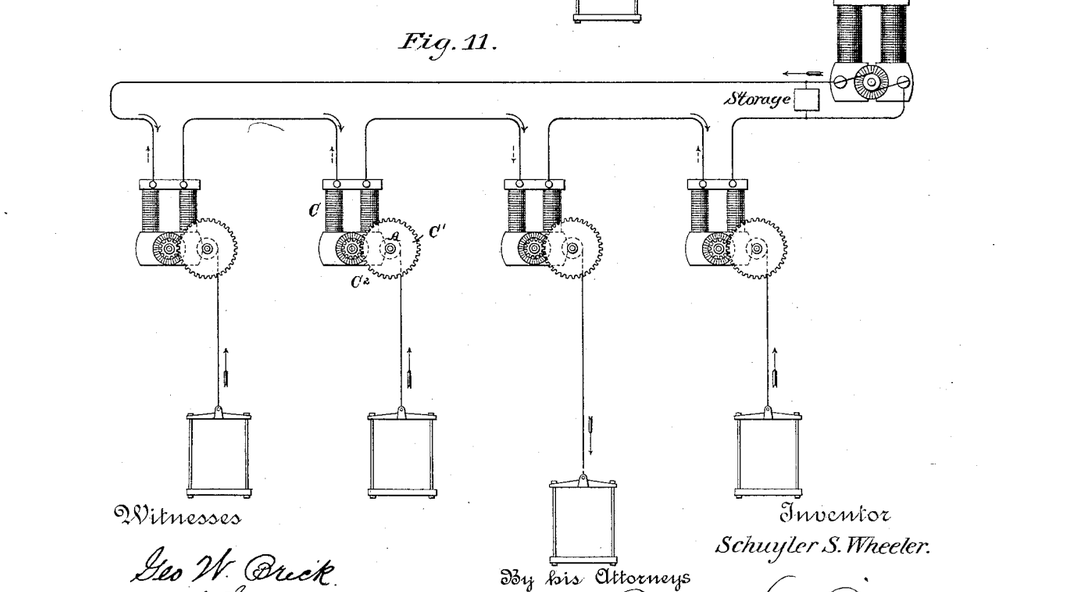
Fig. 11, a similar view showing another organization in which several elevators are connected in series in the generator-circuit, to carry out my invention on the "series" system.

The several arrangements of my invention which have been described all contemplate a multiple-arc connection. In Fig. 11, however, I have shown an arrangement of motors connected in series in which the broad principle of my invention—viz., the utilization of the energy generated by a descending load or car to supplement or increase the electric energy of the working system or circuits—is illustrated. Under this arrangement the hoisting-drum is geared directly with the motor-shaft, so that when the car descends the motor-shaft is run in an opposite direction, and the current generated is therefore in the same direction as the received current from the source of energy. Three of the elevator-cars illustrated are being elevated, as indicated by the solid arrows. The back current which they generate or tend to generate is indicated at these motors by the dotted arrows. One car is, however, shown as descending. Its motor, being run, therefore, in a reverse direction, will generate a current in the same direction as the current from the source of energy. This current is indicated by the dotted arrow. Obviously, as it is a current in the direction of the main current, it serves to increase the sum of the electrical energy in the circuit, and is therefore effective in assisting in the actuation of the other motors. In this figure I have shown a storage-battery connected in multiple arc at the generator. Although it is true that this battery is not charged by the descent of the elevator-car so as to be subsequently efficient in the circuit, it serves several useful purposes. For instance, if the dynamo-brushes should break the circuit or the dynamo should otherwise become inoperative, the circuit completed through the storage system would give a circuit for the motors, so that their armatures would offer resistance, as before mentioned, when driven by the descent of the car, thus insuring the proper descent of the car. The storage system, also, as is obvious, would serve to supplement the action of the dynamo or generator in case the current derived from the generator should for any reason fall below its proper electro-motive force. The amount of difference of rapidity of ascent and descent (with or without load) of the car in these organizations is entirely a question of the lowness of resistance of the motor and circuit; for with very low resistance a very slight change of speed, and therefore electro-motive force, will effect all the necessary increase of current.

In my Letters Patent No. 273,208, granted to me February 27, 1883, I have shown and described an apparatus designed to accomplish the same purpose as that herein set forth—that is, to utilize the energy generated by the descent of the body to assist in its subsequent elevation. The organization in that patent, however, is inoperative for this purpose, and the patent has been surrendered for reissue in order that such inoperative matter may be eliminated from it.

The several organizations herein described represent different phases of my invention; but the invention is not limited to specific constructions.

I am aware of the arrangement shown in German Patent No. 25,840, of 1884, in which cars, each having a dynamo thereon, are run in opposite directions on parallel inclined tracks, the dynamo on the descending car generating electricity to drive the ascending car, in which the dynamo then acts as a motor. I do not, therefore, claim any such arrangement.

I am also aware that it has been proposed to utilize the gravitation of a train of cars on a downgrade to run a dynamo and charge a storage-battery to light the train, and I do not, therefore, claim any such matter.

I claim as my invention—

1. The combination of a normally-constant source of electric energy, its circuit, an elevator or support for raising and lowering matter, an electric motor in said circuit for hoisting said elevator, which motor may be caused to act at the will of the operator to raise the elevator, connecting mechanism between the motor and elevator, whereby the armature of the motor is mechanically driven when the elevator descends, thereby working the motor as a dynamic generator of electricity, and the means or manner, substantially such as described, for utilizing the current thus generated.

2. The combination of a source of electric energy, its circuit, an electric motor therein, a car or support actuated by the motor for raising and lowering material, connecting mechanism between the motor and elevator, whereby the motor is driven as a dynamic electric generator when the elevator-car descends, and a storage system or secondary battery which is charged by the current thus generated.

3. The combination of a source of electric energy, its circuit, an electric motor therein, a car or support actuated by the motor for raising and lowering material, connecting mechanism between the car or support and motor, whereby the motor is mechanically driven as a dynamic electric generator when the car descends, a storage system or secondary battery which is charged by the current thus generated, and circuit-connections, whereby the current from the storage system is utilized to elevate the car.

4. The combination of a source of electric energy, its circuit, an electric motor therein, a car or support actuated by the motor for raising and lowering material, circuit-controlling devices for throwing the motor into action to raise the elevator at the will of the operator, connecting mechanism between the car and motor, whereby the motor is mechanically driven as a dynamic electric generator when the car descends, and circuit connections and appliances, substantially such as described, for utilizing the current thus generated to reduce the sum of the electric energy that would otherwise be drawn from the primary source or generator to work said elevator.

5. The combination of a source of electric energy, its circuit, an electric motor therein, a car or support hoisted by the motor, connecting mechanism between the car and motor, whereby the motor is driven as a dynamic electric generator without changing its direction of rotation when the car is descending, and clutch devices for throwing the motor into action to elevate the car or permitting the motor to be driven by the descent of the car.

6. The combination of a source of electric energy, its circuit, an electric motor therein, a car or support hoisted by the motor, connecting mechanism between the car and motor for hoisting the car, and also mechanism whereby the motor is driven by the descending car as a dynamic electric generator without changing its direction of rotation, means, substantially as described, for normally clutching the two mechanisms, so as to hold the elevator-car at rest, and clutch devices for throwing either of said mechanisms out of connection, so that the car may be elevated or permitted to descend.

In testimony whereof I have hereunto subscribed my name.

SCHUYLER S. WHEELER.

Witnesses:
W. WADSWORTH,
GEO. B. CARVER.